(12) United States Patent
Meza et al.

(10) Patent No.: US 6,581,660 B2
(45) Date of Patent: Jun. 24, 2003

(54) TIRE WITH RUBBER TREAD OF CAP/BASE CONSTRUCTION WHEREIN THE TREAD BASE RUBBER COMPOSITION CONTAINS COMBINATION OF ANTI-REVERSION AGENTS

(75) Inventors: Roberto Cerrato Meza, North Canton, OH (US); James Joseph Golden, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 141 days.

(21) Appl. No.: 09/810,021

(22) Filed: Mar. 15, 2001

(65) Prior Publication Data

US 2003/0015271 A1 Jan. 23, 2003

(51) Int. Cl.⁷ ............................. B60C 1/00; B60C 11/00
(52) U.S. Cl. .................................................. 152/209.5
(58) Field of Search ......................... 152/209.5, 209.18, 152/905

(56) References Cited

U.S. PATENT DOCUMENTS

| | | | |
|---|---|---|---|
| 5,503,940 A | * | 4/1996 | Majumdar et al. |
| 5,623,007 A | * | 4/1997 | Kuebler |
| 5,696,188 A | | 12/1997 | D'Sidocky et al. .......... 524/219 |
| 5,728,757 A | | 3/1998 | D'Sidocky et al. .......... 524/219 |
| 5,739,198 A | * | 4/1998 | Sandstrom et al. |
| 5,843,249 A | * | 12/1998 | Ryba et al. |
| 6,095,217 A | * | 8/2000 | Nakamura et al. |
| 6,319,993 B2 | * | 11/2001 | Weidenhaupt et al. |
| 6,329,457 B1 | * | 12/2001 | Datta et al. |
| 6,336,486 B1 | * | 1/2002 | Iwasaki et al. |
| 2001/0018944 A1 | * | 9/2001 | Mizuno |
| 2002/0062894 A1 | * | 5/2002 | Miner et al. |
| 2002/0088521 A1 | * | 7/2002 | Mizuno |
| 2002/0128105 A1 | * | 9/2002 | Hedberg et al. |

FOREIGN PATENT DOCUMENTS

| | | | |
|---|---|---|---|
| EP | 988999 | * | 3/2000 |
| JP | 3-7602 | * | 1/1991 |

OTHER PUBLICATIONS

"Post Vulcanization Stabilization of Natural Rubber Through the Use of Duralink® HTS", *Flexsys Technical Bulletin*, Flexsys America, L.P. Copyright 1996–97.

* cited by examiner

*Primary Examiner*—Steven D. Maki
(74) *Attorney, Agent, or Firm*—Henry C. Young, Jr.

(57) ABSTRACT

The invention relates to a tire with rubber tread of cap/base construction. The tread base underlies the tread cap. The tread base is relatively thick, namely at least 50 percent of the thickness of the tread cap. It is desired that the tread base rubber composition contains a significant amount of sulfur to enhance physical properties of the tread base. The tread base rubber composition contains a combination of anti-reversion agents to counteract a tendency for reversion of physical properties of the tread base which is relatively thick as compared to the tread cap. The combination of anti-reversion co-agents is 1,3-bis-(citraconimidomethyl) benzene and hexamethylene 1,6-bis(thiosulfate), disodium salt, dehydrate thereby substantially maintaining the integrity of physical properties of the tread base, reduced tire operating temperature, as well as retarded or eliminated groove cracking in the tread cap has been observed.

2 Claims, No Drawings

TIRE WITH RUBBER TREAD OF CAP/BASE CONSTRUCTION WHEREIN THE TREAD BASE RUBBER COMPOSITION CONTAINS COMBINATION OF ANTI-REVERSION AGENTS

FIELD OF THE INVENTION

The invention relates to a tire with rubber tread of cap/base construction. The tread base underlies the tread cap. The tread base is relatively thick, namely at least 50 percent of the thickness of the tread cap. It is desired that the tread base rubber composition contains a significant amount of sulfur to enhance physical properties of the tread base. The tread base rubber composition contains a combination of anti-reversion agents to counteract a tendency for reversion of physical properties of the tread base which is relatively thick as compared to the tread cap. The combination of anti-reversion co-agents is 1,3-bis-(citraconimidomethyl)benzene and hexamethylene 1,6-bis (thiosulfate), disodium salt, dihydrate. By thereby substantially maintaining the integrity of physical properties of the tread base, reduced tire operating temperature, as well as retarded or eliminated groove cracking in the tread cap has been observed.

BACKGROUND OF THE INVENTION

Tires, particularly light and medium duty truck tires, are often manufactured with a tread of a cap/base construction in which the tread base has a relatively thick cross-section which may be sometimes be greater than 50 percent of the thickness of the tread cap. Such cap/base construction of tire treads is well known to those having skill in such art as are truck tire treads with treads which contain a relatively thick tread base as compared to the thickness of the tread cap.

Conventionally, a tread cap, of a tread cap/base construction, is designed to be ground-contacting and thus is conventionally configured with lugs and grooves and/or ribs and grooves and is usually comprised of a rubber composition intended to provide suitable traction, rolling resistance and treadwear for the tire.

The associated tread base, which is conventionally co-extruded with and underlies the tread cap is not normally intended to be ground-contacting. The tread base is usually designed to be a buffer between the tread cap and tire carcass and is usually of a rubber composition which has adequate heat durability and physical properties such as modulus and rebound, a hysteretic property.

For some truck tire treads, particularly for tire carcasses of a bias ply construction, the tread base is relatively thick, as compared to the thickness of the tread cap, and is often of a thickness of at least 50 percent of the thickness of the associated tread cap, instead of being a relatively thin tread base of a thickness less than about 30 percent of the thickness of the associated tread cap as may be found, for example, in passenger tires. This is in contrast to radial ply tires, such as example passenger tires and light truck tires, which often have a tread of a cap/base construction where such tread base is often relatively thin, such as being less than 30 percent of the thickness of the associated tread cap.

Relatively thick tread bases present unique problems insofar as reversion of rubber properties due to, for example, endurance of relatively high tire cure temperatures as well as relatively high operational temperatures at vehicular loads and speeds. Such rubber properties of concern are, for example, reduction of 300 percent modulus and reduction in rebound (100° C.) values For example, upon shaping and curing the tire in a suitable mold at cure temperatures in a range of about 140° C. to 150° C., for example, the relatively thick tread base, because of its relatively large rubber mass, might remain hot for a period of time so that it may sometimes tend to over cure to an extent that a degree of cure reversion, or degradation of the sulfur bond, may occur and rubber properties such as, for example, 300 percent modulus and rebound, may be adversely reduced, insofar as their desirable properties for a tread base, are concerned.

Conventionally, then, relatively low levels of sulfur content may be conventionally used for such relatively thick tread base rubber compositions to minimize cure reversion, usually in a range, for example, of about 0.75 to about 1.5 phr of sulfur curative.

However, if enhanced 300 percent modulus and/or rebound property for the tread base rubber composition is desired, increased sulfur curative for content of the rubber composition is usually used, in a range, for example, of about 2.5 to about 5 phr.

Accordingly, it is desired to minimize a reversion of physical properties such as 300 percent modulus and/or rebound due to exposure of the tread base rubber composition to elevated temperatures whether during cure or under service conditions, particularly where it is desired to use from 2.5 to 5 phr of sulfur curative in the tread base rubber composition to enhance its 300 percent modulus and/or rebound physical properties.

It is therefore appreciated that the phenomenon of reversion of physical properties in the accelerated sulfur vulcanization of cis 1,4-polyisoprene (natural or synthetic) or other diene-based elastomers is undesirable. Reversion occurs when polysulfidic crosslinks deteriorate with time and temperature. Subsequently, this can lead to a reduction in crosslink density and a deterioration of physical properties (lower modulus and higher hysteresis).

In the description of this invention, the term "phr," where used herein, and according to conventional practice, refers to "parts of a respective material per 100 parts by weight of rubber or elastomer".

In the description of this invention, the terms "rubber" and "elastomer," if used herein, may be used interchangeably, unless otherwise prescribed. The terms "rubber composition," "compounded rubber" and "rubber compound," if used herein, are used interchangeably to refer to "rubber which has been blended or mixed with various ingredients and materials" and such terms are well known to those having skill in the rubber mixing or rubber compounding art. The terms "cure" and "vulcanize" may also be used interchangeably unless otherwise noted.

In the description of this invention, portions of tire treads designed to be ground contacting are described as being configured with lugs and grooves. Such tread lugs are intended herein to mean individual tread lugs as well as somewhat continuous lugs in a form of circumferential ribs which are often simply referred to as being ribs or tread ribs.

SUMMARY AND DESCRIPTION OF THE INVENTION

In accordance with this invention, a tire is provided which a rubber tread of a co-extruded cap/base construction wherein said tread base underlies said tread cap, is of a thickness of at least 50 percent of the thickness of said tread cap and is of a sulfur vulcanizable rubber comprised of, based upon parts by weight per 100 parts by weight rubber (phr)

(A) 100 phr by weight of at least one diene-based elastomer of which a major portion, or at least 55 weight percent, of the elastomer(s) is cis 1,4-polyisoprene natural rubber, (B) about 2.5 to about 5 phr of sulfur, (C) about 0.5 to about 10 phr of 1,3-bis-(citraconimidomethyl)benzene and hexamethylene 1,6-bis(thiosulfate), disodium salt, dihydrate in a weight ratio of said benzene and said disodium salt materials in a range of from about 0.2/1 to about 0.5/1, and (D) to about 60 phr of reinforcing filler as
  (1) about 5 to about 50 phr of rubber reinforcing carbon black by having an Iodine value in a range of about 38 to about 48 g/kg (ASTM D1510) and dibutyl phthalate DBP) value in a range of about 110 to about 130 cm$^3$/100 g (ASTM D2414), and
  (2) about 10 to about 20 phr of aggregates of precipitated silica, wherein said precipitated silica contains hydroxyl groups (e.g. silanol groups) in its surface.

Preferably such tread base rubber composition is exclusive of a coupling agent for said precipitated silica and particularly exclusive of coupling agents such as bis(3-triethoxysilylpropyl) polysulfides, which contain from 2 to 8 with an average of from 2 to 2.6 or from 3.5 to 4, connecting sulfur atoms in their polysulfidic bridge.

The practice of this invention is considered to be particularly applicable where it is desired to provide a relatively thick tread base, of a tread cap/base configuration, where a balance between sulfur content, reversion of physical properties due to exposure to elevated temperatures of such tread base rubber concerned. In particular, it is desired to endeavor to minimize reversion in tire tread base rubber composition applications where such compositions are to be subjected to relatively high temperature use under a tire's, particularly a truck tire's dynamic working conditions. Such reversion may be evidenced by dynamic aging of various physical properties of the rubber composition usually resulting in a reduction of one or more desirable physical property values for the rubber composition such as, for example, tear resistance, modulus, rebound and/or hardness values.

The 1,3-bis-(citraconimidomethyl)benzene and hexamethylene 1,6-bis(thiosulfate), disodium salt, dehydrate rubber anti-reversion agents may be obtained as Perkalink 900 and Duralink HTS, respectively, from the Flexsys Company.

The combination of 1,3-bis-(citraconimidomethyl)benzene and hexamethylene 1,6-bis(thiosulfate), disodium salt, dihydrate appears to act in a synergistic anti-reversion effect insofar as the tire tread base rubber composition is concerned in that the aged bulk tear strength is greater and the heat generation is less than when either material is used alone.

Indeed, while the mechanism might not be fully understood, they are believed to be materials of a manner to resist reversion of elastomer composition properties at elevated temperatures under dynamic working conditions in that as sulfur cross links break down (reversion) they are repaired by being replaced by more thermally stable carbon—carbon crosslinks.

In a further practice of this invention, such tire is provided wherein said tread cap is configured with lugs and grooves,
  wherein an outer surface of at least a portion of said lugs is designed to be ground-contacting,
  wherein said tread cap rubber composition is exclusive of said 1,3-bis-(citraconimidomethyl)benzene and hexamethylene 1,6-bis(thiosulfate), disodium salt, dihydrate,
  wherein said tread cap rubber composition is comprised of at least two elastomers selected from styrene/butadiene copolymer elastomer, cis 1,4-polybutadiene rubber and cis 1,4-polyisoprene rubber and wherein said tread cap rubber composition contains about 35 to about 90 phr of reinforcing filler comprised of at least 5 phr of rubber reinforcing carbon black and from about 30 to about 60 phr of precipitated silica and a silica coupler for said silica having one moiety reactive with hydroxyl groups (e.g. silanol groups) on the surface of said silica and another moiety interactive with said elastomers, and
  wherein any crack initiation or propagation of the tread cap rubber composition in the region of the bottom of said tread cap grooves is retarded by the inclusion of said 1,3-bis-(citraconimidomethyl)benzene and hexamethylene 1,6-bis(thiosulfate), disodium salt, dihydrate in said tread base rubber composition.

The carbon black desired for use in this invention is N550, an ASTM designation which has a reported Iodine value of about 43 g/kg and a reported DBP value of about 120 cm$^3$/100 g. Such carbon black is considered herein as a relatively cool running carbon black which has less tendency to generate heat and a corresponding temperature build up as compared to more conventionally used smaller rubber reinforcing carbon blacks for tire tread caps such as for example N110, N220 and N234.

Thus, the aforesaid combination of materials for use as an anti-reversion acting combination is considered herein to be particularly beneficial for use in this invention where heat build-up, and accompanying elevated temperatures under dynamic working conditions are present for the relatively thick, moderate sulfur content, tire tread base rubber composition is concerned.

In the practice of this invention, as hereinbefore pointed out, the rubber composition for the tire tread base, which underlies the tread cap, in a tire tread of cap/base construction, is comprised primarily of natural rubber (cis 1,4-polyisoprene), namely at least 55 weight percent, and usually more preferably, at least 80 weight percent based upon the elastomer content of the tread base rubber composition. Often, it is composed solely (100 percent) of the cis 1,4-polyisoprene natural rubber insofar as the elastomer content of the rubber composition is concerned.

However, the rubber composition may also contain some amount (e.g. less than 50 and preferably less than 45 phr) of at least one other diene-based elastomer. Such other elastomers are typically selected from homopolymers and copolymers of conjugated dienes and copolymers of conjugated diene(s) and vinyl aromatic monomers such as, for example, styrene and alpha-methylstyrene, preferably styrene.

Such dienes may, for example, be selected from isoprene and 1,3-butadiene and such vinyl aromatic monomers may be selected from styrene and alpha-methylstyrene, preferably styrene.

Such other elastomers may be selected, for example, from at least one of 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70 to 95 percent trans), low vinyl polybutadiene rubber (10 to 30 percent vinyl), high vinyl polybutadiene rubber (30 to 90 percent vinyl).

In one aspect, the rubber is preferably comprised of at least two diene-based rubbers. For example, if a combination of two or more rubbers is preferred, a majority is cis 1,4-polyisoprene rubber (natural or synthetic, although natural is usually preferred) and a minority (e.g. about 10 to about 45, or from about 10 to about 20, phr) may be for example 3,4-polyisoprene rubber, isoprene/butadiene copolymer rubber, styrene/isoprene/butadiene rubber, emulsion and solution polymerization derived styrene/butadiene rubbers, cis 1,4-polybutadiene rubbers, medium vinyl polybutadiene rubbers (30 to 55 percent vinyl), high vinyl polybutadiene rubbers (55 to 90 percent vinyl).

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, coupling agent, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur-vulcanizable and sulfur-vulcanized material (rubbers), the additives mentioned above are selected and commonly used in conventional amounts.

The composition of the present invention may contain conventional amounts of known rubber chemicals.

Typical amounts of tackifier resins, if used, may comprise about 0.5 to about 10 phr, usually about 1 to about 5 phr. Typical amounts of plasticizers comprise about 1 to about 50 phr. Such plasticizers can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr. Typical amounts of fatty acids, if used, which are usually comprised primarily of stearic acid, comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization of the rubber composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.5 to about 2.5 being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 0.5 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of most of the above additives are not considered to be an aspect of the present invention, unless otherwise observed.

The rubber composition may be and is preferably prepared by mixing the diene-based rubber, carbon blacks and other rubber compounding ingredients, exclusive of the rubber curatives, in at least one sequential mixing step with at least one mechanical mixer, usually referred to as "non-productive" mix stage(s), to a temperature in a range of about 150° C. to about 180° C. for one to about 4 minutes, followed by a final mix stage in which the curatives, such as sulfur and accelerators, are added and mixed therewith for about 1 to about 4 minutes to a temperature within a range of about 90° C. to about 125° C. The terms "non-productive" and "productive" mix stages are well known to those having skill in the rubber mixing art.

It is to be appreciated that the rubber composition is conventionally cooled to a temperature below about 40° C. between the aforesaid mix stages.

It is to be further appreciated that the aforesaid duration of time for the required temperature maintenance for the mixing process(es) during the non-productive mix stages can be accomplished, for example, by (A) adjusting the motor speed of the mixer, namely reducing the motor speed after the desired temperature of the rubber composition is reached, in a variable speed mixer or by (B) utilizing two or more mix stages sufficient to satisfy the duration requirement for the aforesaid maximum mixing temperature maintenance.

Vulcanization of the rubber composition of the present invention is generally carried out at conventional temperatures ranging from 100° C. to 200° C. Preferably, the vulcanization is conducted at temperatures ranging from 110° C. to 180° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a tread for a pneumatic tire which is the subject of this invention. Such tires can be built, shaped, molded and cured by various methods which are known and will be readily apparent to those having skill in such art. As can be appreciated, the tire may be a passenger tire, aircraft tire, truck tire and the like. Preferably, the tire is a passenger tire. The tire may also be radial or bias, with a radial tire being preferred.

The invention may be better understood by reference to the following examples in which the parts and percentages are by weight unless otherwise indicated.

EXAMPLE I

In this example, natural rubber (cis 1,4-polyisoprene) based compositions are prepared.

In particular, Control Sample A is comprised of the natural cis 1,4-polyisoprene rubber. Sample B is comprised of the natural rubber, a higher level of sulfur, N550 carbon black and higher level of silica. Sample C is comprised of the natural rubber and all of the materials in Sample B and 1,3-bis-(citraconimidomethyl)benzene. Sample D is comprised of the natural rubber and all of the materials in Sample B and hexamethylene 1,6-bis(thiosulfate), disodium salt, dihydrate. Sample E is comprised of the natural rubber and all of the materials in Sample B and a combination of the 1,3-bis-(citraconimidomethyl)benzene and hexamethylene 1,6-bis(thiosulfate), disodium salt, dihydrate.

The compositions were prepared by mixing the ingredients in several stages, namely, one non-productive stage (without the curatives) followed by a productive mix stage (for the curatives), then the resulting composition was cured under conditions of elevated pressure and temperature.

For the non-productive mixing stage, exclusive of the accelerator(s) and sulfur curatives which are mixed (added) in the final, productive mixing stage, the ingredients, including the elastomers, are mixed for about four minutes to a temperature of about 160° C. In a final productive mixing stage the curatives are mixed with the rubber composition (mixture) in a Banbury type mixer; namely, the accelerator (s) and sulfur to a maximum temperature of about 110° C. for about three minutes.

The resulting rubber compositions were then vulcanized at a temperature of about 150° C. for about 18 minutes.

The following Table 1 relates to the ingredients used for the Control Sample A and Samples B through E.

TABLE 1

| Materials | Control Sample A | Sample B | Sample C | Sample D | Sample E |
|---|---|---|---|---|---|
| Non-Productive Mix | | | | | |
| Natural Rubber[1] | 100 | 100 | 100 | 100 | 100 |
| Carbon black[2] | 30 | 0 | 0 | 0 | 0 |
| Carbon black[3] | 0 | 30 | 30 | 30 | 30 |
| Zinc oxide | 5 | 5 | 5 | 5 | 5 |
| Stearic acid | 2 | 2 | 2 | 2 | 2 |
| Silica[4] | 10 | 15 | 15 | 15 | 15 |
| Anti-reversion Agent (1)[5] | 0 | 0 | 1 | 0 | .4 |
| Anti-reversion Agent (2)[6] | 0 | 0 | 0 | 1.5 | 1.5 |
| Productive Mix | | | | | |
| Sulfur | 1.35 | 2.8 | 2.8 | 2.8 | 2.8 |
| Accelerator(s)[7] | 2.3 | 1.2 | 1.2 | 1.2 | 1.2 |

[1]Cis 1,4-polyisoprene natural rubber
[2]N347, an ASTM designation, obtained as N347 from the Sid-Richardson Company
[3]N550, an ASTM designation, obtained as N550 from the Sid-Richardson Company
[4]Obtained as HiSil 315 from PPG Industries
[5]1,3-bis-(citraconimidomethyl)benzene obtained as Perkalink 900 from the Flexsis Company
[6]Hexamethylene bis(thiosulfate), disodium salt, dihydrate obtained as Duralink HTS from the Flexsys Company
[7]Of the sulfenamide type

TABLE 2

| | Control Sample A | Sample B | Sample C | Sample D | Sample E |
|---|---|---|---|---|---|
| Original 18'/150° C. | | | | | |
| 300% modulus (MPa) | 14.5 | 11.4 | 12.1 | 13.3 | 12.9 |
| Tensile strength (MPa) | 30 | 22.5 | 23.9 | 25.6 | 24.4 |
| Elongation (%) | 500 | 471 | 473 | 495 | 495 |
| Aged 18'/150 C. Aged 100 h @ 70° C. | | | | | |
| Tensile strength (MPa) | 28 | 8.2 | 7.1 | 22.6 | 23.4 |
| Elongation (%) | 380 | 142 | 121 | 378 | 390 |
| MDR Rheometer 150° C. | | | | | |
| Minimum torque (dNm) | 2.1 | 2.6 | 2.3 | 2 | 2.4 |
| Maximum torque (dNm) | 16.7 | 15.9 | 15.5 | 15.9 | 16 |
| Net torque (dNm) | 14.7 | 13.3 | 13.2 | 13.9 | 13.6 |
| T25 (min) | 5.7 | 6.5 | 6.7 | 6.9 | 5.7 |
| T90 (min) | 9.8 | 10.6 | 11 | 11 | 10.1 |
| Rebound | | | | | |
| Zwick at 100° C. | 76 | 83.4 | 83 | 84.6 | 83.4 |
| RPA | | | | | |
| Uncured G' (15%) 0.833 Hz (kPa) | 152.3 | 206.4 | 175.4 | 164 | 194.6 |

TABLE 2-continued

|  | Control Sample A | Sample B | Sample C | Sample D | Sample E |
|---|---|---|---|---|---|
| Cured Frequency 1.0 Hz |  |  |  |  |  |
| G' (1%) (kPa) | 1453 | 1034.4 | 1023.7 | 1025.4 | 1142.3 |
| G' (50%) (kPa) | 780 | 582.5 | 581.4 | 662.5 | 718.6 |
| Tan delta (10%) | 0.085 | 0.072 | 0.075 | 0.075 | 0.072 |
| Tan delta (15%) | 0.085 | 0.07 | 0.076 | 0.071 | 0.067 |
| Reversion at 191° C. (%) | 20.2 | 53.6 | 34.2 | 30 | 25 |
| Bulk Tears - Original |  |  |  |  |  |
| Maximum (N) | 1017 | 1454.5 | 1532.3 | 1446 | 1427 |
| Average (N) | 797.5 | 1185.8 | 1289.5 | 818 | 1038 |
| Failure | Rough | Rough | Rough | Rough | Rough |
| Bulk Tears - Aged |  |  |  |  |  |
| Maximum (N) | 218 | 160.1 | 330.7 | 152 | 585 |
| Average (N) | 144.7 | 123.2 | 256 | 63 | 482 |
| Failure | Rough | Rough | Rough | Rough | Rough |
| Goodrich Flex |  |  |  |  |  |
| Temperature change (° C.) | 15.5 | 16.6 | 16.6 | 12.2 | 11.1 |
| Time (min) | 15 | 15 | 15 | 15 | 15 |
| Percent set | 1.3 | 4.4 | 4.1 | 0.9 | 0.6 |
| Blowout |  |  |  |  |  |
| Time (min) | 60 | 60 | 60 | 60 | 60 |
| Temperature (° C.) | 114 | 110 | 110 | 106.1 | 107.2 |

Table 2, it is seen that unaged bulk tear values for Samples B, C, and E increased by approximately 48, 62 and 30 percent, respectively, as compared to Control Sample A Thus the rubber compositions of Samples B, C and E are considered herein to be more resistant to tearing.

Aged bulk tear strength for Sample E increased by a greater amount (233 percent as compared to control Sample A) than aged bulk tear strength for either of Samples B, C or D which indicates that the tear resistance is maintained through aging to a greater extent on Sample E than Samples A through D. Only the combined use of 1,3-bis-(citraconimidomethyl)benzene and Hexamethylene bis (thiosulfate), disodium salt, dihydrate provides this level or tear strength retention.

The term "bulk tear" refers to a value, in Newtons, for the force required to pull a cured, pre-scored block of rubber apart with the two ends of the rubber samples being pulled apart at a 180 degree angle to each other using an Instron instrument operated at about 23° C. at a crosshead speed of 20 inches per minute (about 51 cm/minute). The area of the tear is determined by scoring the rubber block to a specific depth. Also the width of the tear is recorded after testing. The samples are then pulled apart and the force in Newtons measured.

As it can be seen in Table 2, Sample B shows that the additional sulfur, changed carbon black type and increased silica demonstrated a significant improvement in the original bulk tear as compared to Control Sample A. However, the aged tear is inferior.

Sample C shows that the addition of the 1,3-bis-(citraconimidomethyl)benzene additive demonstrated a significant improvement in the original and aged bulk tear strength as compared to Control Sample A.

Sample D shows that the addition of the hexamethylene bis(thiosulfate), disodium salt, dihydrate additive did not demonstrate a significant improvement in original or aged bulk tear strength as compared to Control Sample A.

Sample E shows that the addition of the 1,3-bis-(citraconimidomethyl)benzene and the hexamethylene bis (thiosulfate), disodium salt, dihydrate additives demonstrated a significant improvement in aged bulk tear strength as compared to Control Sample A as well as Sample B, Sample C and Sample D.

It can also be seen from Table 2 that Samples B, C, D and E by all the measures of heat generation (rebound, tan delta, Goodrich Flex temperature rise, and Goodrich Blow Out) are superior (less heat generated) to the control Sample A. Sample E is the only one which provides maintenance of physical properties after aging, namely less reversion.

This is considered herein to be significant because maintenance of physical properties as aging occurs and lower heat generation will combine to improve the tire durability.

It is considered herein that a particular benefit of using the combination of 1,3-bis-(citraconimidomethyl)benzene and the hexamethylene bis(thiosulfate), disodium salt, dihydrate is the high temperature stability it imparts to sulfur cured natural rubber based rubber compositions.

EXAMPLE II

Two bias ply truck tires of size 11.00–20 were prepared with a rubber tread of a cap/base construction where the thickness of the tread base is greater than 50 percent of the thickness of the tread cap. The tread cap was configured with ribs and grooves and was designed to be ground-contacting. The underlying tread base was designed to not be road contacting.

The tread base rubber compound of one tire was comprised of a composition similar to Control Sample A of Example I and the base rubber compound of the other tire was comprised of a rubber composition similar to Sample E of Example I. The tires are referred herein as Control Tire AA and Sample EE, respectively.

The tread cap was of a rubber composition comprised of a blend of cis 1,4-polybutadiene rubber and emulsion polymerization derived styrene/butadiene rubber (E-SBR) and was exclusive of said 1,3-bis-(citraconimidomethyl)benzene and hexamethylene 1,6-bis(thiosulfate) disodium salt, dihydrate.

The tires were mounted on metal rims to form a tire/wheel assembly and inflated to an appropriate working pressure.

The tire/wheel assemblies were mounted on a dynamometer and run at an equivalent vehicular speed of 30 miles per hour (about 11.5 km per hour). The centerline temperatures of the tread rubber were periodically measured by a probe and reported in the following Table 3.

TABLE 3

| | Centerline Temperature | |
|---|---|---|
| Running Time | Control Tire AA | Tire EE |
| After 47 hours | 130° C. | 107° C. |
| After 57 hours | 142° C. | 128° C. |

It can readily be seen from Table 3 that the tread rubber base of Tire EE, which contained the combination of 1,3-bis-(citraconimidomethyl)benzene and hexamethylene 1,6-bis(thiosulfate) disodium salt, dihydrate ran very substantially cooler in point of time of running the tire than the Control Tire AA.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a rubber tread of a co-extruded cap/base construction wherein said tread base underlies said tread cap, wherein said tread cap is of a lug and groove configuration, and wherein said tread base is of a thickness of at least 50 percent of the thickness of said tread cap and said tread base is of a tread base rubber composition which is comprised of, based upon parts by weight per 100 parts by weight rubber (pbr)

(A) 100 phr by weight of at least one diene-based elastomer of which at least 55 weight percent of the elastomer(s) is cis 1,4-polyisoprene natural rubber, (B) about 2.5 to about 5 phr of sulfur, (C) about 0.5 to about 10 phr of 1,3-bis-(citraconimidomethyl)benzene and hexamethylene 1,6-bis(thiosulfate), disodium salt, dihydrate wherein a weight ratio of said 1,3-bis-(citraconimidomethyl) benzene to said hexamethylene 1,6-bis(thiosulfate), disodium salt, dihydrate is in a range of from about 0.2/1 to about 0.5/1, and (D) about 25 to about 60 phr of reinforcing filler as (1) about 5 to about 50 phr of rubber reinforcing carbon black characterized by having an Iodine value in a range of about 38 to about 48 g/kg (ASTM D1510) and dibutyl phthalate (DBP) value in a range of about 110 to about 130 cm$^3$/100 g (ASTM D2414), and (2) about 10 to about 20 phr of aggregates of precipitated silica, wherein said precipitated silica contains hydroxyl groups in its surface; and wherein said tread cap is of rubber composition which is exclusive of said 1,3-bis-(citraconimidomethyl) benzene and hexamethylene 1,6-bis(thiosulfate), disodium salt, dihydrate.

2. The tire of claim 1 wherein said tread base rubber composition is exclusive of a coupling agent for said precipitated silica.

* * * * *